US009301496B2

(12) United States Patent
Reiss et al.

(10) Patent No.: US 9,301,496 B2
(45) Date of Patent: Apr. 5, 2016

(54) PET TOY TREAT DISPENSER

(71) Applicant: The KONG Company LLC, Golden, CO (US)

(72) Inventors: Steve R. Reiss, Manchester, NH (US); Chuck Costello, Louisville, CO (US)

(73) Assignee: The KONG Company, LLC, Golden, CO (US)

( * ) Notice: Subject to any disclaimer, the term of this patent is extended or adjusted under 35 U.S.C. 154(b) by 0 days.

(21) Appl. No.: 14/330,180

(22) Filed: Jul. 14, 2014

(65) Prior Publication Data

US 2014/0318462 A1    Oct. 30, 2014

Related U.S. Application Data

(63) Continuation of application No. 13/801,300, filed on Mar. 13, 2013, now Pat. No. 8,904,967.

(51) Int. Cl.
  *A01K 29/00*  (2006.01)
  *A01K 5/01*   (2006.01)
  *A01K 15/02*  (2006.01)

(52) U.S. Cl.
  CPC ............. *A01K 5/0114* (2013.01); *A01K 15/025* (2013.01)

(58) Field of Classification Search
  CPC ...... A01K 5/0114; A01K 15/025; A01K 5/00
  USPC ................. 119/702, 707, 708, 709, 710, 711, 119/51.01
  See application file for complete search history.

(56) References Cited

U.S. PATENT DOCUMENTS

| | | | |
|---|---|---|---|
| 547,764 | A | 10/1895 | Boyum |
| 563,170 | A | 6/1896 | Haley et al. |
| 1,100,286 | A | 6/1914 | Cornelius |
| D50,377 | S | 2/1917 | Ehrlich |
| D70,800 | S | 8/1926 | McDonald |
| D75,863 | S | 7/1928 | Nicholas |
| 2,115,405 | A | 4/1938 | Allen |
| 2,134,812 | A | 11/1938 | Dick |
| 2,187,493 | A | 1/1940 | Gordon |
| 2,269,941 | A | 1/1942 | Jones |
| D177,323 | S | 4/1956 | Guest |
| 3,105,457 | A | 10/1963 | Krueger |
| D197,889 | S | 4/1964 | Hass |
| 3,450,592 | A | 6/1969 | Conrad et al. |
| 3,524,267 | A | 8/1970 | Barrett et al. |
| D220,279 | S | 3/1971 | Oliver |
| 3,597,874 | A | 8/1971 | Ogsbury et al. |

(Continued)

OTHER PUBLICATIONS

U.S. Appl. No. 14/053,159, filed Oct. 14, 2013, Simon et al.

(Continued)

*Primary Examiner* — Trinh Nguyen
(74) *Attorney, Agent, or Firm* — Sheridan Ross P.C.

(57) ABSTRACT

A treat dispenser is provided for an animal to dispense treats by moving the dispenser. The dispenser includes a central spherical body, and a plurality of peripherally spaced spheres or balls connected to the body by respective branches. Each of the balls has a treat dispensing opening. The body has an opening for charging or loading treats. The device is substantially hollow. As an animal plays with the device, treats are dispensed through the openings. The openings are located at different positions on each of the balls so that treats are likely to be dispensed when the device is placed at various orientations.

6 Claims, 6 Drawing Sheets

(56) References Cited

U.S. PATENT DOCUMENTS

| | | |
|---|---|---|
| D221,962 S | 9/1971 | Vennola |
| 3,648,404 A | 3/1972 | Ogsbury et al. |
| 3,694,954 A | 10/1972 | Brumlik |
| 3,808,737 A | 5/1974 | Abrams |
| 3,847,305 A | 11/1974 | Tobin |
| 4,153,248 A | 5/1979 | Holmes et al. |
| 4,170,106 A | 10/1979 | Koslosky |
| 4,240,412 A | 12/1980 | James |
| D260,662 S | 9/1981 | Hida |
| 4,309,038 A | 1/1982 | Spoon |
| D275,410 S | 9/1984 | Panicci |
| D276,544 S | 11/1984 | Piesco |
| D277,983 S | 3/1985 | Kaminski |
| D283,634 S | 4/1986 | Kato et al. |
| 4,617,001 A | 10/1986 | Parein |
| D291,174 S | 8/1987 | Koziol |
| 4,787,191 A | 11/1988 | Shima |
| D301,161 S | 5/1989 | Dunse |
| D308,185 S | 5/1990 | Valkner |
| D313,455 S | 1/1991 | McKinney |
| D328,328 S | 7/1992 | Juarez |
| 5,195,510 A | 3/1993 | Svacina |
| 5,199,716 A | 4/1993 | DeFluiter et al. |
| 5,318,470 A | 6/1994 | Denny |
| D354,995 S | 1/1995 | Barzani |
| D359,092 S | 6/1995 | Brovelli |
| D369,661 S | 5/1996 | Taylor |
| D376,015 S | 11/1996 | Newberry |
| D377,100 S | 12/1996 | Gladieux, Jr. |
| 5,702,105 A | 12/1997 | Glikmann |
| D396,110 S | 7/1998 | Kang |
| D396,226 S | 7/1998 | Davis, Sr. |
| D396,253 S | 7/1998 | Beecher |
| D396,501 S | 7/1998 | Hatting |
| D399,890 S | 10/1998 | Esterle et al. |
| 5,832,877 A | 11/1998 | Markham |
| D403,429 S | 12/1998 | Blanchard |
| 5,947,061 A | 9/1999 | Markham et al. |
| D422,084 S | 3/2000 | Mickelson |
| 6,073,581 A | 6/2000 | Wang |
| D431,848 S | 10/2000 | Hubbard |
| 6,129,053 A | 10/2000 | Markham et al. |
| D439,378 S | 3/2001 | Loomis |
| 6,217,408 B1 | 4/2001 | Willinger |
| 6,237,538 B1 | 5/2001 | Tsengas |
| 6,264,522 B1 | 7/2001 | Dickson |
| D447,809 S | 9/2001 | Gladieux, III et al. |
| 6,386,540 B1 | 5/2002 | Stevkovski |
| 6,427,634 B1 | 8/2002 | Mann |
| 6,439,166 B1 | 8/2002 | Markham |
| 6,443,863 B1 | 9/2002 | Dinoffer |
| 6,463,759 B1 | 10/2002 | Garcia et al. |
| 6,470,830 B2 | 10/2002 | Mann |
| 6,526,912 B1 | 3/2003 | Ottoson |
| D473,348 S | 4/2003 | Lang |
| D475,766 S | 6/2003 | Tolosa |
| 6,579,145 B1 | 6/2003 | Maxim |
| 6,626,727 B2 | 9/2003 | Balanchi |
| D484,248 S | 12/2003 | O'Brien |
| 6,669,526 B2 | 12/2003 | Manville et al. |
| 6,688,258 B1 | 2/2004 | Kolesar |
| D487,327 S | 3/2004 | Andersen et al. |
| 6,761,158 B2 | 7/2004 | Wright |
| 6,846,216 B1 | 1/2005 | Balanchi |
| D501,520 S | 2/2005 | Fraze |
| D503,954 S | 4/2005 | Balanchi |
| 6,899,059 B1 | 5/2005 | Crane et al. |
| 6,899,541 B2 | 5/2005 | Kassai et al. |
| 6,941,895 B2 | 9/2005 | St. Pierre |
| 6,983,722 B2 | 1/2006 | Tepper et al. |
| D520,086 S | 5/2006 | Just et al. |
| D532,113 S | 11/2006 | Huang |
| D535,068 S | 1/2007 | Renforth |
| D536,506 S | 2/2007 | Unlu |
| RE39,563 E | 4/2007 | Markham |
| D544,655 S | 6/2007 | Hass |
| D545,510 S | 6/2007 | Viola |
| 7,246,574 B2 | 7/2007 | Renforth |
| 7,270,085 B2 | 9/2007 | Wolfe, Jr. et al. |
| 7,278,374 B2 | 10/2007 | Mann |
| D554,811 S | 11/2007 | Rutherford |
| D556,913 S | 12/2007 | Laituri |
| D563,493 S | 3/2008 | Nelson et al. |
| 7,354,330 B2 | 4/2008 | Bentley, Jr. |
| 7,389,748 B2 | 6/2008 | Shatoff et al. |
| D577,868 S | 9/2008 | Rutherford et al. |
| D581,543 S | 11/2008 | Ferber et al. |
| D582,049 S | 12/2008 | Ferber et al. |
| D582,563 S | 12/2008 | Ferber et al. |
| D582,998 S | 12/2008 | Chernick et al. |
| D585,162 S | 1/2009 | Partain et al. |
| 7,500,450 B2 | 3/2009 | Wolfe, Jr. et al. |
| 7,506,613 B2 | 3/2009 | Wolfe, Jr. et al. |
| 7,555,997 B2 | 7/2009 | Wolfe, Jr. et al. |
| D599,964 S | 9/2009 | Viola |
| D599,966 S | 9/2009 | Viola |
| 7,591,234 B2 | 9/2009 | Shatoff et al. |
| 7,600,488 B2 | 10/2009 | Mann |
| D614,365 S | 4/2010 | Watson et al. |
| D617,395 S | 6/2010 | Colangelo et al. |
| 7,789,727 B2 | 9/2010 | Chernick et al. |
| 7,806,086 B2 | 10/2010 | Ottoson |
| D627,897 S | 11/2010 | Yde et al. |
| D627,935 S | 11/2010 | Rutherford et al. |
| D629,056 S | 12/2010 | Grimm |
| D634,507 S | 3/2011 | Lawrenson |
| D642,342 S | 7/2011 | Shatoff et al. |
| D650,536 S | 12/2011 | Oblack et al. |
| 8,087,387 B2 | 1/2012 | Gamble et al. |
| 8,141,521 B2 | 3/2012 | Shatoff et al. |
| D660,664 S | 5/2012 | Hsu |
| D660,665 S | 5/2012 | Hsu |
| 8,225,747 B2 | 7/2012 | Markham et al. |
| D665,915 S | 8/2012 | Ma |
| 8,240,273 B2 | 8/2012 | Benson |
| D672,100 S | 12/2012 | Willinger |
| D672,398 S | 12/2012 | Kondou et al. |
| D672,415 S | 12/2012 | Garcia et al. |
| D676,090 S | 2/2013 | Rottje |
| 8,372,111 B2 | 2/2013 | Reyna |
| 8,464,665 B1 | 6/2013 | Scheffler et al. |
| 8,474,404 B2 | 7/2013 | Costello |
| D687,954 S | 8/2013 | Dallman |
| D688,027 S | 8/2013 | Smith et al. |
| 8,516,977 B2 | 8/2013 | Shatoff et al. |
| D700,755 S | 3/2014 | Reiss et al. |
| 2001/0029904 A1 | 10/2001 | Viola |
| 2002/0151248 A1 | 10/2002 | Hsu |
| 2002/0174838 A1 | 11/2002 | Crane et al. |
| 2004/0200434 A1 | 10/2004 | Shatoff et al. |
| 2005/0197211 A1 | 9/2005 | Sullivan et al. |
| 2006/0014467 A1 | 1/2006 | Tusacciu |
| 2007/0044730 A1 | 3/2007 | Axelrod et al. |
| 2007/0077854 A1 | 4/2007 | Jeon et al. |
| 2007/0190892 A1 | 8/2007 | Manvelian |
| 2011/0000441 A1 | 1/2011 | Woltmann et al. |
| 2011/0028063 A1 | 2/2011 | Colangelo et al. |
| 2012/0012068 A1 | 1/2012 | Costello |
| 2012/0184174 A1 | 7/2012 | Kwak et al. |
| 2013/0102220 A1 | 4/2013 | Wang et al. |
| 2013/0210314 A1 | 8/2013 | Rottjer et al. |
| 2014/0261195 A1 | 9/2014 | Reiss et al. |

OTHER PUBLICATIONS

U.S. Appl. No. 29/471,283, filed Oct. 30, 2013, Simon et al.

PET TOY TREAT DISPENSER

CROSS-REFERENCE TO RELATED APPLICATIONS

This application is a continuation of U.S. patent application Ser. No. 13/801,300, filed Mar. 13, 2013, the entire contents of which is incorporated herein by reference.

FIELD OF THE INVENTION

The invention relates to pet toys that dispense food or treats, and more particularly, to a pet toy treat dispenser and method wherein treats are dispensed from openings that may be of different sizes and that are located at different locations and orientations on the toy.

BACKGROUND OF THE INVENTION

Interactive toys for pets have become quite popular. Animal behaviorists attribute many benefits to an animal that is stimulated or preoccupied with a pet toy. Chew toys provide needed mastication for animals such as dogs. Throw toys provide overall physical exercise for dogs. Chew toys with treats provide both mastication and extended interaction since the animal's interest can be better maintained with the reward of receiving an edible treat.

A number of inventions have been developed for increasing the length of time an animal may interact with a toy. Some of the inventions include pet toys that dispense food or treats. Toys with edible treats have proven to remediate separation anxiety experienced by some pets. By increasing the intensity and length of time the animal is occupied, the animal may be less prone to engage in negative behaviors.

One example of an animal food dispenser includes the invention disclosed in U.S. Pat. No. 6,526,912. This reference more specifically discloses a dispenser having a base portion and an upper portion defined by at least one wall enclosing a container cavity. An opening is formed in the upper portion to access the container cavity. A weighted body is fixed to the base of the dispenser, and provides a means for returning the dispenser to an upright position after the dispenser has been tipped or moved by the animal. The dispenser can be moved on a surface in an oscillating and/or sliding motion by the animal for dispensing a unit from the opening.

Another example of an animal food dispenser is described in the U.S. Pat. No. 8,225,747. This reference discloses a treat dispenser having a body with an opening to allow dispensing of the treats. A base of the device includes a weighted material therein causing the device to reside in a normally upright position. Contact by the animal causes the device to tip, thereby allowing treats to fall through the opening in the body. Changing the amount and type of material used for the weighted material changes the characteristics of how the device moves when contacted by the animal that in turn, changes the rate and amount of treats that are dispensed.

Yet another example of an animal food dispenser is described in the U.S. Patent Publication No. US20120012068. This reference discloses a pet toy with an adjustable treat dispensing lid. The lid is connected to a body of the pet toy, and a treat holding enclosure receives treats. The enclosure has an open area which communicates with a treat dispensing opening of the lid enabling treats to be selectively dispensed. The lid may be placed at selected positions with respect to the body thereby changing the size of the exposed treat dispensing opening to thereby selectively change the rate at which treats are dispensed.

While the prior art discloses various methods for dispensing treats or food, there is still a need to provide a treat dispensing device in which the animal has the opportunity to be rewarded with treats dispensed from multiple locations on the pet toy, and that may therefore contribute to a more lasting engagement of the animal with the toy. There is also a need to provide a device that is made simple for loading the treats. Finally, there is also a need to provide a device in which the treats can be dispensed from not only separate locations on the device, but also at different orientations or sides on the device that may further contribute to a longer engagement by the animal since the animal will require additional time to investigate treat dispensing opportunities.

SUMMARY OF THE INVENTION

In accordance with the invention, a treat or food dispensing device and method are provided. The word "treat" hereinafter is meant to include all animal foodstuffs that can be consumed by an animal. Treats may take various forms such as uniformly sized nuggets or the treats can be irregularly sized and shaped.

The device is characterized by a central spherical body, and three peripherally spaced bulbous shaped elements or balls that extend from the body by interconnecting branches or necks. More specifically, the body is rounded or spherical shaped with a top central opening that may be used to load treats. The interior of the device is hollow, and the interior of the body therefore defines a central cavity. In a preferred embodiment, three balls are provided and the balls are spaced from one another approximately 120°. Each of the balls is interconnected to a mid-point on the body by a corresponding neck or branch. Each of the balls also includes a treat dispensing opening for selectively dispensing treats loaded in the interior of the device. The openings in the balls communicate with internal chambers of the balls and through the corresponding branches into the central cavity.

The treat dispensing openings in the balls are located on different sides of the balls, and each may be selectively sized. In a preferred embodiment, the treat dispensing openings for the three balls are located such that there is one opening facing a top surface, another opening facing a bottom surface, and another opening facing an annular or peripheral edge of the device. By providing these treat dispensing openings at different orientations, the animal may be encouraged to have an extended engagement with the device in which continual turning or rotation of the device provides opportunities for additional treats to be dispensed. Unlike treat dispensing devices that may have but one opening or more than one opening located along the same side or plane of the device, the present invention encourages a more vigorous play action by the animal in which continual movement of the device enhances chances that the animal will receive additional treats.

The user charges or loads the device with treats through the top central opening. The top central opening also serves as another treat dispensing opening, and may be selectively sized to allow a desired rate of dispenser for selected treats. As the device is moved by the animal, treats will be dispensed through the various treat dispensing openings, and the device may be refilled.

Other features and advantages of the present invention will become apparent from a review of the following detailed description, taken in conjunction with the drawings.

BRIEF DESCRIPTION OF THE DRAWINGS

The present invention will now be further described in the Detailed Description which follows with reference being made to the following drawings in which.

DETAILED DESCRIPTION

Figure 1:
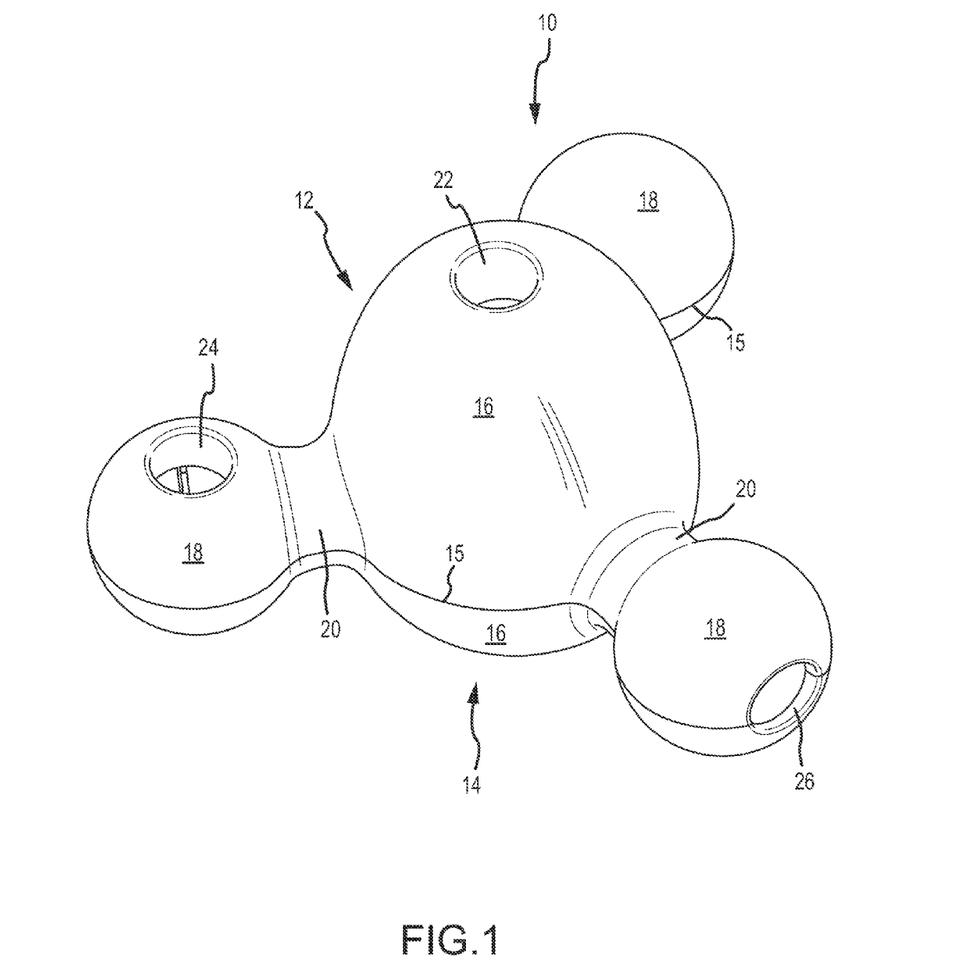
FIG. 1 is a top perspective view of the invention in a preferred embodiment.
Figure 2:
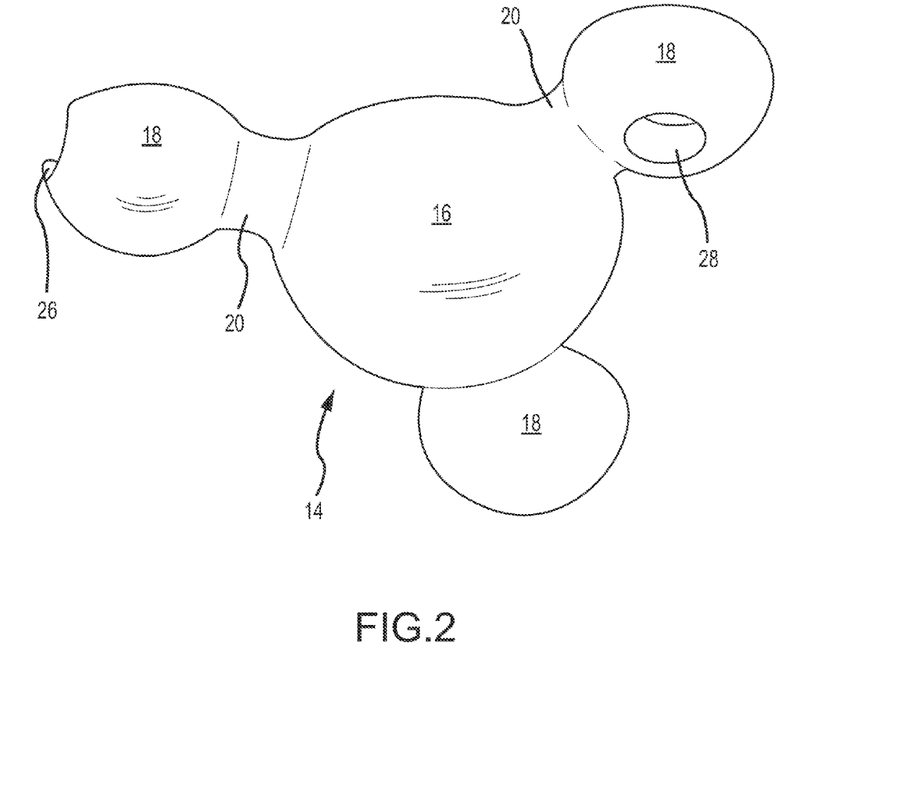
FIG. 2 is a bottom perspective view of a lower half section of the invention according to the embodiment of FIG. 1.
Figure 3:
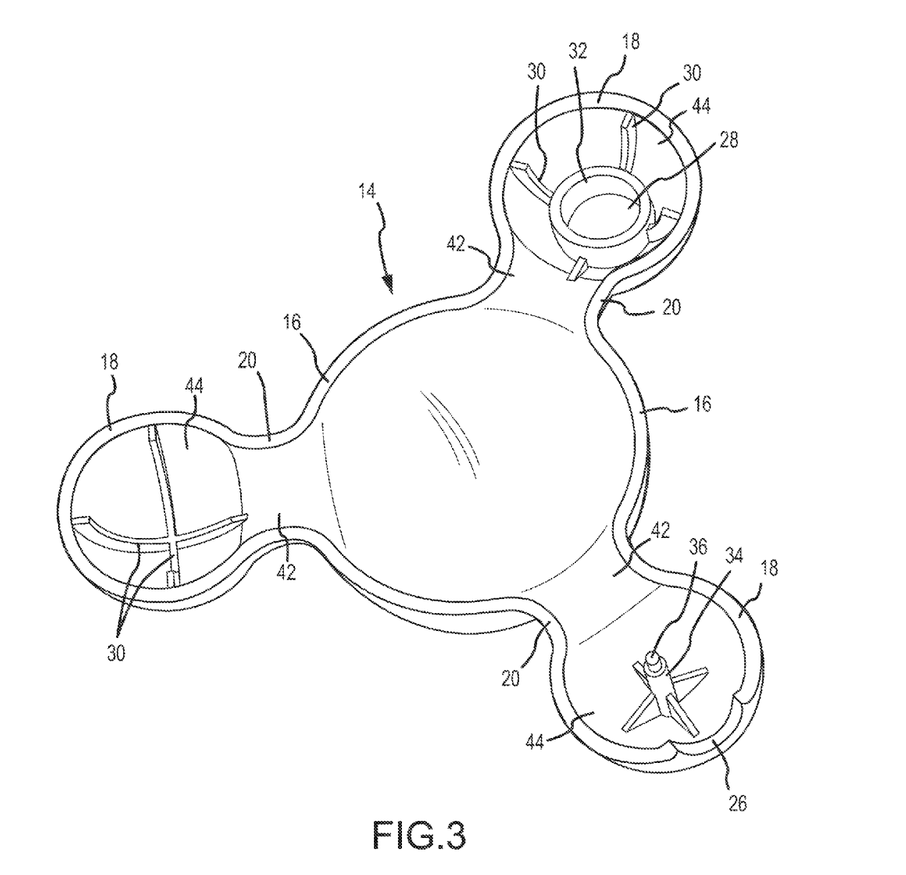
FIG. 3 is a top perspective view of the lower half section according to the embodiment of FIG. 1.
Figure 4:
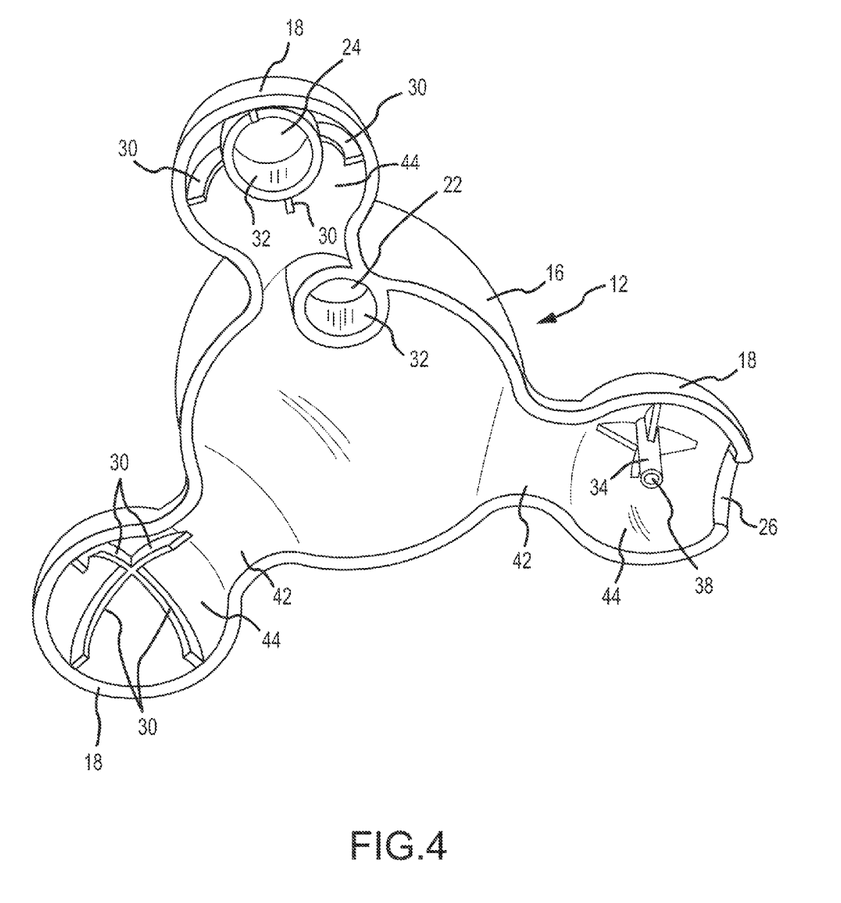
FIG. 4 is a bottom perspective view of an upper half section according to the embodiment of FIG. 1.

FIG. 1 illustrates the dispenser device 10, according to the invention in a preferred embodiment. The dispenser 10 has an upper half section 12 and a lower half section 14 in which the sections 12 and 14 are connected to one another along a joint or plane 15. As shown, the joint 15 substantially bisects the dispenser 10. The primary or major components of the dispenser 10 include a central spherical body 16, and three peripherally spaced bulbous elements or balls 18. Each of the balls 18 is connected to the body 16 by a corresponding neck or branch 20. The body 16 has a top central opening 22 that can be used to load treats, and may also act as a treat dispensing opening. Yet further in an alternative embodiment, the central top opening 22 could be eliminated in favor of providing the openings 24, 26, and 28 that can also be used to load treats. The body 16 and the balls 18 in the preferred embodiment are illustrated as being substantially bisected by the joint 15; however, it is also contemplated that the body and/or balls 18 could have a larger portion thereof within the upper half section 12 or lower half section 14 such that the joint 15 does not bisect the device. Also referring to FIGS. 2-4, the dispenser 10 is substantially hollow, and the interior of the body defines a central cavity 40. As shown in FIGS. 3 and 4, the device 10 has a substantially uniform thickness along the joint 15. The hollow interiors of the necks 20 define respective passageways 42 that communicate with the hollow interiors of the balls 18 which define respective chambers 44.

The balls 18 are shown as being spaced from one another approximately 120°. Although three balls are shown, the invention also contemplates more than or fewer than three balls that could be provided in a preferred embodiment. For example, the invention could include two balls spaced approximately 180° from one another, or four balls spaced approximately 90° from one another.

The other treat dispensing openings are shown as a top opening 24, an annular opening. 26, and a bottom opening 28, each formed on the respective balls 18. With the orientation or arrangement of the openings 24, 26, 28, a treat dispensing "opportunity" is created for moving the device when placed in various positions. Accordingly, as an animal plays with the device, treats can be selectively and continually dispensed as the device continues to be turned or rotated. Each of the treat dispensing openings can be made of a desired size to accommodate different types of treats, as well as a dispense rate for each opening. For example, it may be desirable to provide one or more of the treat dispensing openings with a relatively smaller size, thereby slowing the rate of dispense, while it may be desirable to provide one or more of the other treat dispensing openings with a relatively larger size, thereby increasing the rate of dispense.

Other structural details of the device 10 include stiffeners 30 that may be formed on the interior sides of the balls 18 in order to provide additional structural support to the device 10. Additionally, each of the treat dispensing openings are illustrated as having flanges 32 that define the respective openings, and that also provide additional structural support. The flanges also provide a means to direct the direction of dispense for treats within the respective chambers 44.

Figure 5:
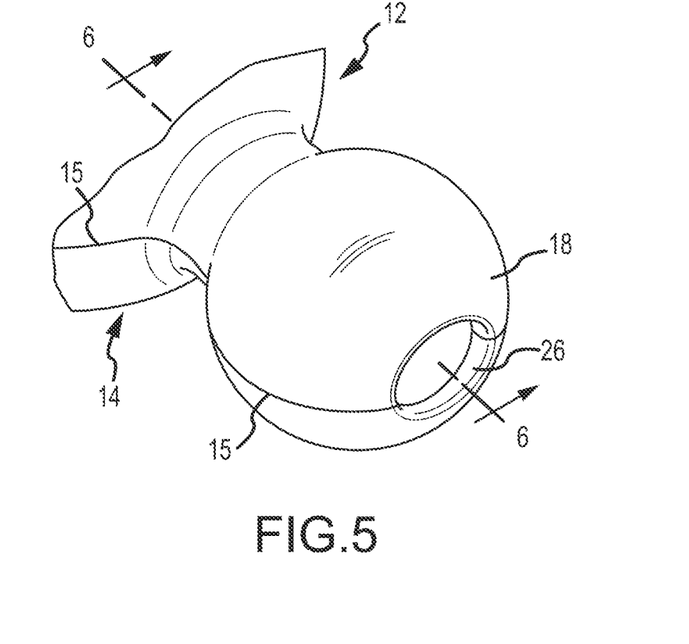
FIG. 5 is an enlarged fragmentary perspective view of a portion of the device according to the embodiment of FIG. 1.
Figure 6:
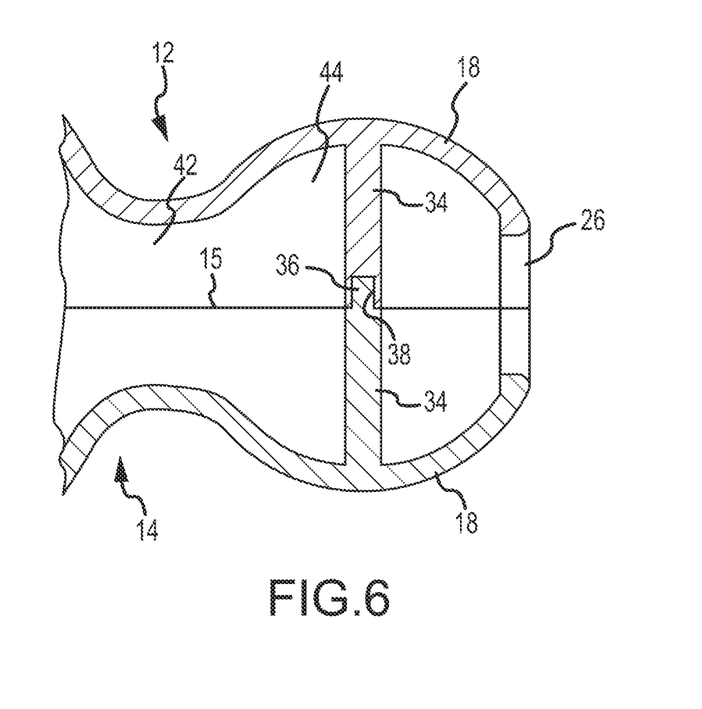
FIG. 6 is a vertical cross section taken along line 6-6 of FIG. 5.

Referring also to FIGS. 5 and 6, in order to assemble the half sections 12 and 14, it may be desirable to provide some type of connecting structure which helps to align the sections. As shown in FIGS. 3 and 4, alignment mounts 34 are provided on opposing sides of a ball 18 to align the sections. One of the mounts 34 has a pin 36, and the other mount 34 has an opening 38 to receive the pin 36. More than one of the pairs of mounts 34 may be provided in order to attach the half sections. In one aspect of the invention, it is contemplated that the two half sections 12 and 14 can be connected by use of a plurality of mounts 34, but the sections 12 and 14 may be separated from one another in order to clean the interior of the device. In another aspect, it is contemplated that the half sections 12 and 14 may be sealed to one another, and therefore a single pair of mounts 34 is adequate for initial alignment of the half sections prior to sealing. In this latter case, effective cleaning of the interior of the device is still possible since numerous openings are provided in the device for flushing of a cleaning liquid.

Figure 7:
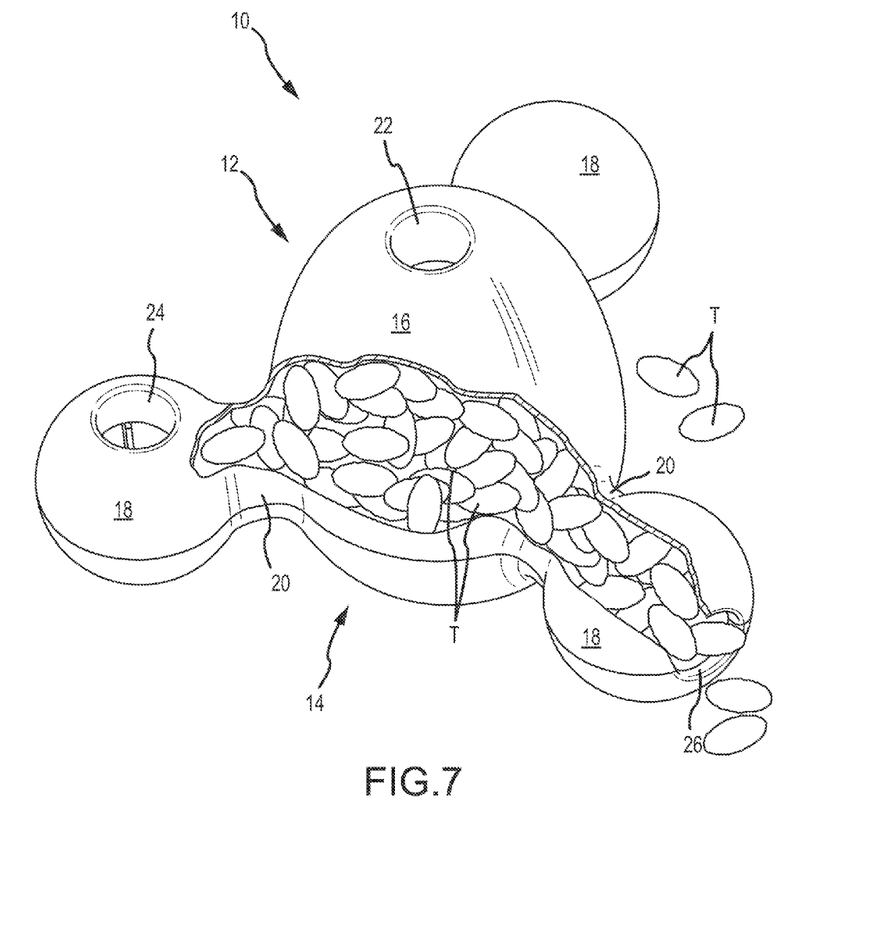
FIG. 7 is a fragmentary perspective view illustrating treats loaded within the device, and a few treats that have been dispensed from treat dispensing openings.

Referring to FIG. 7, in one method of dispensing treats, the treats are loaded through the top central opening 22, and initially reside within the central cavity 40. As the animal plays with the device 10, the treats become dispersed through passageways 42 into the chambers 44, and the treats are ultimately dispensed through the treat dispensing openings 24, 26, and 28. As mentioned, the top central opening 22 may also serve as a treat dispensing opening. FIG. 7 more specifically illustrates a plurality of treats T that are located within the central cavity 40 in which some of the treats T have traveled through the respective passageways 42 into the chambers 44, and then through the treat dispensing openings. As the animal continues to play with the device additional treats T will be dispensed. Greater, more intense play by the animal in which the device is continually turned and rotated will result in a greater number of treats being dispensed.

It is also contemplated that restrictions can be placed within the device in order to further assist in metering or controlling the rate at which treats are dispensed. For example, the stiffeners 30 can be sized to also act as treat dispensing restrictors. Additionally, the number and size of the mounts 34 can also act as treat dispensing restrictors. Yet further, the size of the passageways 42 can be sized in order to set a dispense rate of the treats.

Although the present invention has been disclosed in a preferred embodiment, it shall be understood that various other changes and modifications can be made to the invention in accordance with the scope of the claims appended hereto.

What is claimed is:

1. A method of dispensing treats from a treat dispensing device, said method comprising:

providing a treat dispensing device including a body having a central cavity, an opening in the body communicating with said central cavity, and at least two ball shaped elements spaced from and connected to, said body, said elements each including a treat dispensing opening that communicates with said central cavity;

loading, through said opening in said body, the central cavity with selected treats; and moving said device so that treats are dispensed from the central cavity through said treat dispensing openings and said body opening.

2. The method, as claimed in claim 1, wherein the treat dispensing device includes three ball shaped elements and a first element includes a top treat dispensing opening, a second element includes an annular treat dispensing opening, and a third element includes a bottom treat dispensing opening.

3. The method, as claimed in claim 2, wherein one or more of said treat dispensing openings has a larger size thereby increasing a rate of dispense of the treats.

4. The method, as claimed in claim 1, wherein the body opening is spaced from the ball shaped elements.

5. The method, as claimed in claim 1, wherein said treat dispensing device further includes at least two branches each having a length, internal passageways, and first and second ends, each first end connected to said body, wherein each of the ball shaped elements are connected to said body by a corresponding second end of a branch of the at least two branches, and wherein each internal passageway communicates with said central cavity and an internal chamber of a corresponding ball shaped element.

6. The method, as claimed in claim 1, wherein each of said ball shaped elements has an internal chamber, wherein said treat dispensing openings each include a flange that extends inward towards said internal chamber, and wherein said flange directs a direction of a flow of said treats from said internal chamber.

\* \* \* \* \*